United States Patent
Lee

(10) Patent No.: US 9,357,893 B2
(45) Date of Patent: Jun. 7, 2016

(54) MOBILE DEVICE GENERATING MAP INFORMATION TO AN ELECTRONIC DEVICE

(71) Applicant: MSI COMPUTER (SHENZHEN) CO., LTD., Shenzhen, Guangdong Province (CN)

(72) Inventor: Yung-Shen Lee, Taipei (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 99 days.

(21) Appl. No.: 13/974,653

(22) Filed: Aug. 23, 2013

(65) Prior Publication Data

US 2014/0343783 A1    Nov. 20, 2014

(30) Foreign Application Priority Data

May 17, 2013    (CN) .......................... 2013 1 0184562

(51) Int. Cl.
*A47L 9/28* (2006.01)
*G05D 1/00* (2006.01)
*G05D 1/02* (2006.01)

(52) U.S. Cl.
CPC ............ *A47L 9/2894* (2013.01); *G05D 1/0011* (2013.01); *G05D 1/0044* (2013.01); *G05D 1/024* (2013.01); *G05D 1/0272* (2013.01); *G05D 1/0274* (2013.01); *G05D 2201/0203* (2013.01)

(58) Field of Classification Search
None
See application file for complete search history.

(56) References Cited

U.S. PATENT DOCUMENTS

| | | | |
|---|---|---|---|
| 5,995,884 A * | 11/1999 | Allen et al. ...................... 701/24 |
| 2002/0153184 A1* | 10/2002 | Song et al. ..................... 180/167 |
| 2007/0209143 A1* | 9/2007 | Choi et al. ....................... 15/339 |
| 2009/0166102 A1* | 7/2009 | Waibel et al. ................... 180/7.1 |
| 2009/0182464 A1* | 7/2009 | Myeong et al. .................. 701/25 |
| 2011/0264305 A1* | 10/2011 | Choe et al. .......................... 701/2 |
| 2012/0259481 A1* | 10/2012 | Kim .................................. 701/2 |

FOREIGN PATENT DOCUMENTS

| | | | |
|---|---|---|---|
| EP | 2 175 337 A2 | 4/2010 |
| EP | 2 508 957 A2 | 10/2012 |
| WO | WO 2007/051972 A1 | 5/2007 |

OTHER PUBLICATIONS

Reister D B et al: "Demo 89—the initial experiment with the Hermies-III robot", Proceedings of the International Conference on Robotics and Automation; Sacramento, Apr. 9-11, 1991; Los Alamitos, IEEE Comp. Soc. Press, US, vol. Conf. 7, (Apr. 9, 1991), pp. 2562-2567, XP010024119.

* cited by examiner

*Primary Examiner* — Rami Khatib
(74) *Attorney, Agent, or Firm* — Birch, Stewart, Kolasch & Birch, LLP

(57) ABSTRACT

A mobile device moving in a specific area including a driving unit, an environment sensing unit, a control unit and a transmittal unit is disclosed. The driving unit moves according to a first driving signal. The environment sensing unit detects an outline of the specific area to generate detection information. The control unit processes the detection information to generate first map information and position information. The transmittal unit transmits the first map information to an electronic device. The electronic device generates second map information according to the first map information, and the control unit generates the first driving signal according to the first map information, the second map information and the position information.

14 Claims, 4 Drawing Sheets

MOBILE DEVICE GENERATING MAP INFORMATION TO AN ELECTRONIC DEVICE

CROSS REFERENCE TO RELATED APPLICATIONS

This Application claims priority of China Patent Application No. 201310184562.1, filed on May 17, 2013, the entirety of which is incorporated by reference herein.

BACKGROUND OF THE INVENTION

1. Field of the Invention

The invention relates to a mobile device, and more particularly, to a mobile device, which is capable of generating first map information to an electronic device and receiving second map information generated from the electronic device.

2. Description of the Related Art

With technological advancements, the number of the types of electronic products, including cleaning robots, has increased. Generally, a sign object is used to limit a cleaning area of a cleaning robot. When a cleaning robot performs a cleaning operation, if the cleaning robot detects the existence of a sign object, the cleaning robot avoids the area of the sign object.

Thus, before a cleaning robot performs a cleaning operation, a user has to place sign objects. If a user forgets to place a sign object, the cleaning robot may enter dangerous areas, for example, an outdoor area. Moreover, in order to achieve preferred cleaning effect, several sign objects are usually required to reduce the cleaning area of the cleaning robot. However, a large number of sign objects increases costs and also negatively affects the aesthetic interior design of a house.

BRIEF SUMMARY OF THE INVENTION

In accordance with an embodiment, a mobile device moving in a specific area comprises a driving unit, an environment sensing unit, a control unit and a transmittal unit. The driving unit moves according to a first driving signal. The environment sensing unit detects an outline of the specific area to generate detection information. The control unit processes the detection information to generate first map information and position information. The transmittal unit transmits the first map information to an electronic device. The electronic device generates second map information according to the first map information, and the control unit generates the first driving signal according to the first map information, the second map information and the position information.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
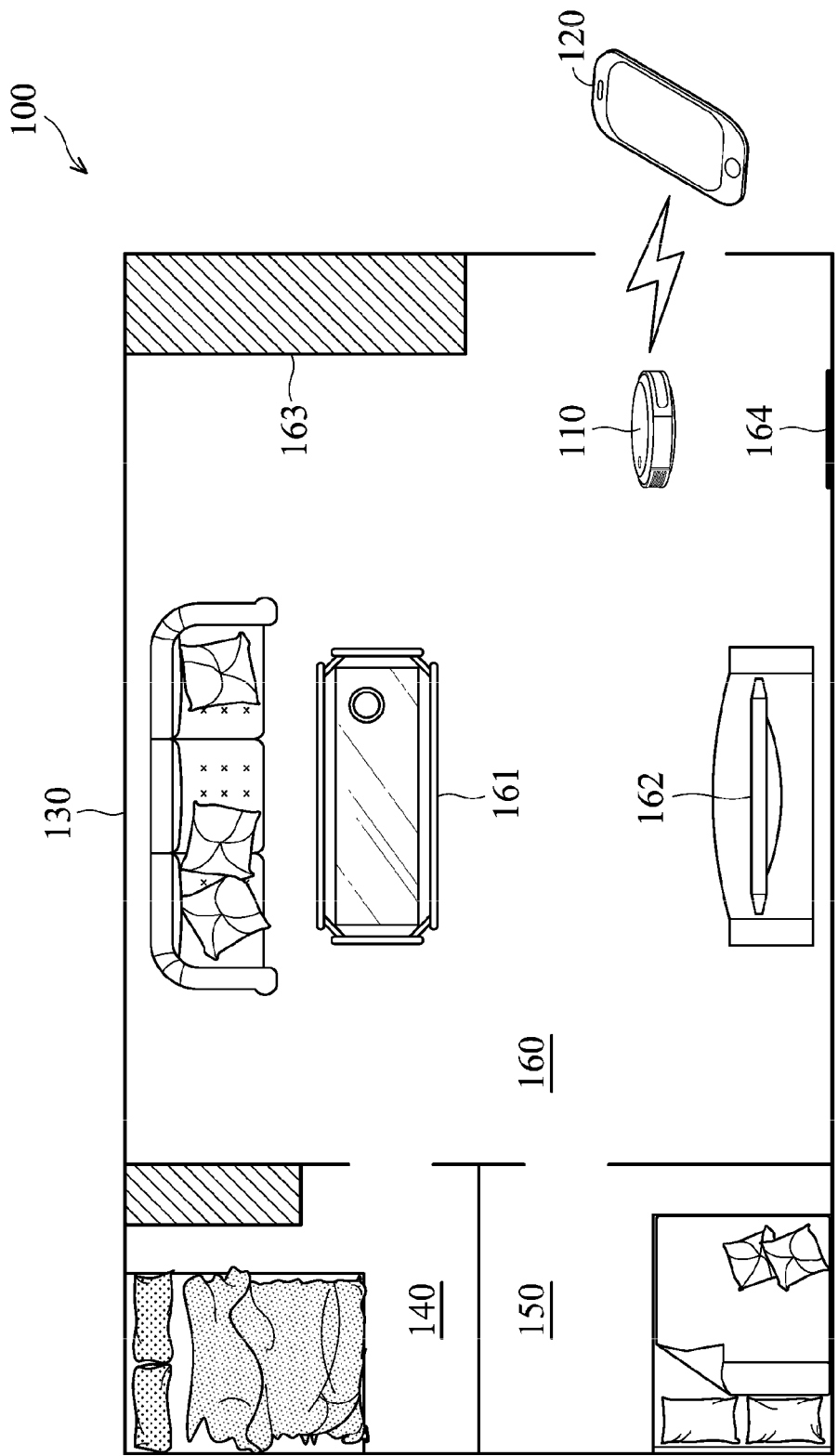
FIG. 1 is a schematic diagram of an exemplary embodiment of a control system in accordance with some embodiments.

FIG. 1 is a schematic diagram of an exemplary embodiment of a control system in accordance with some embodiments. The control system 100 comprises a mobile device 110 and an electronic device 120. There is no limitation to the kinds of the mobile device 110. In some embodiments, the mobile device 110 is a robot with a cleaning function, such as a sweeping robot or a mopping robot. The mobile device 110 moves in a specific area 130. The specific area 130 has rooms 140 and 150 and a living room 160.

The disclosure does not limit the kind of the electronic device 120. Any device can serve as the electronic device 120, as long as the device is capable of processing signals. In some embodiments, the electronic device 120 is a smart phone or a computer. In this embodiment, the electronic device 120 is separated from the mobile device 110, but the disclosure is not limited thereto. The disclosure does not limit the location of the electronic device 120. The electronic device 120 can be disposed at any position, as long as the electronic device 120 is capable of communicating with the mobile device 110. In some embodiments, the electronic device 120 is disposed on the outside or inside of the specific area 130.

The disclosure does not limit the communication method between the mobile device 110 and the electronic device 120. In some embodiments, the mobile device 110 communicates with the electronic device 120 according to a wireless transmittal method, such as Infrared transmittal or a Bluetooth transmittal. In other embodiments, the mobile device 110 communicates with the electronic device 120 according to a wire transmittal method, such as a USB 2.0 protocol, a USB 3.0 protocol or other protocol method.

Figure 2:
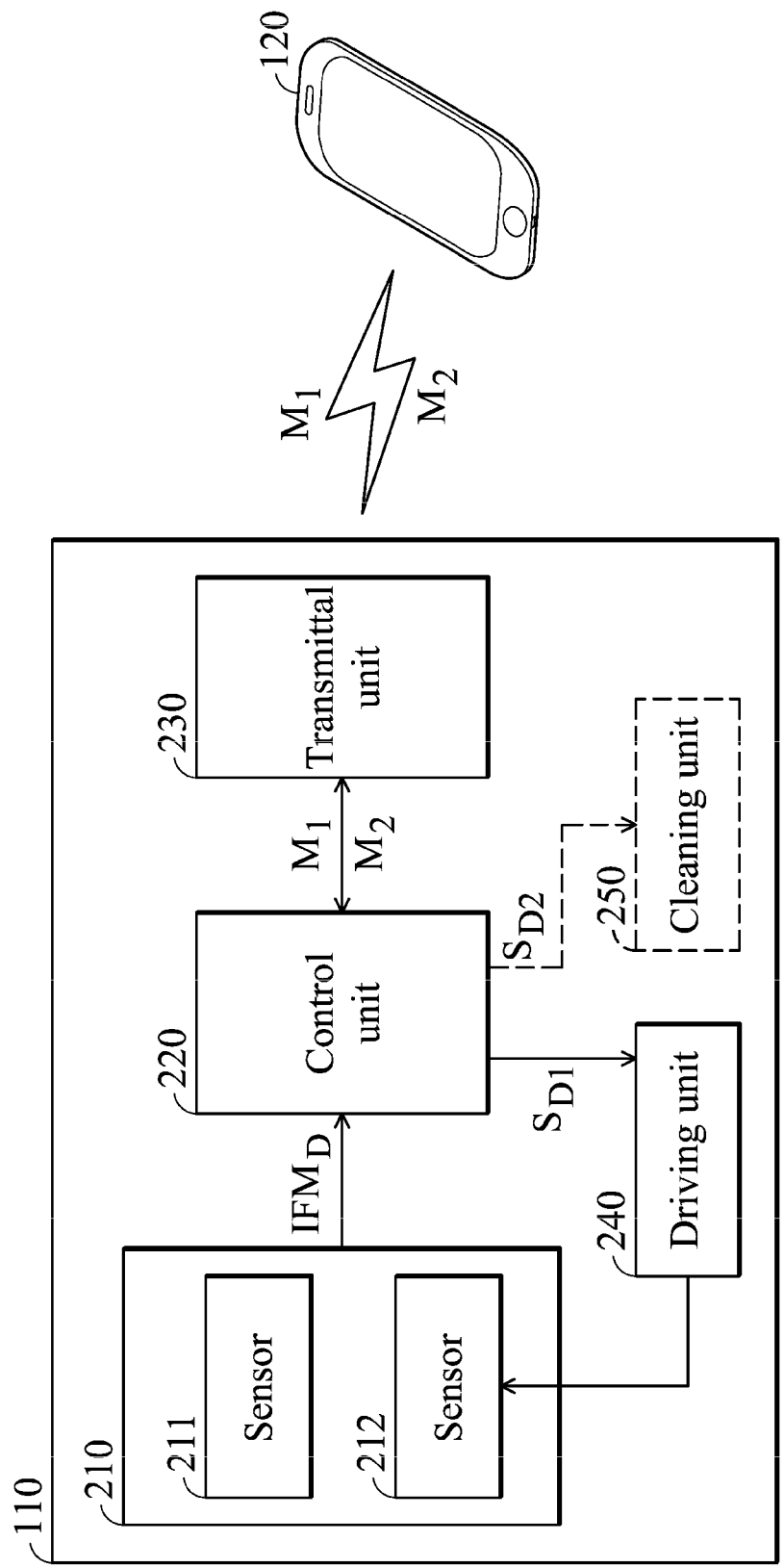
FIG. 2 is a schematic diagram of an exemplary embodiment of a mobile device in accordance with some embodiments

FIG. 2 is a schematic diagram of an exemplary embodiment of a mobile device in accordance with some embodiments. The mobile device 110 includes an environment sensing unit 210, a control unit 220, a transmittal unit 230 and a driving unit 240. The environment sensing unit 210 detects the outline of the specific area 130 to generate detection information $IFM_D$. In some embodiments, the environment sensing unit 210 includes sensors 211 and 212.

The output signal of the sensor 211 is combined with the output signal of the sensor 212 to serve as the detection information $IFM_D$. The sensor 211 detects a distance from the mobile device 110 to an object. Taking FIG. 1 as an example, the sensor 211 detects the distance between the mobile 110 and the table 161, the distance between the mobile 110 and the television 162, the distance between the mobile 110 and the cabinet 163 and the distance between the mobile 110 and the wall 164.

The sensor 212 detects a moving length and a moving direction of the driving unit 240. In one embodiment, the driving unit 240 may include wheels, a track, or other movable stages. In other embodiments, the driving unit 240 moves according to a driving signal $S_{D1}$. Taking wheels as an example, the sensor 212 detects the rotation direction of the wheels and the rotation number of the wheels.

In addition, the disclosure does not limit the kind of the sensors 211 and 212. In one embodiment, the sensor 211 may be a sonic sensor, a photo sensor, a magnetic sensor, a laser sensor or an Infrared sensor. In some embodiments, the sensor 212 is an odometer.

Figure 3:
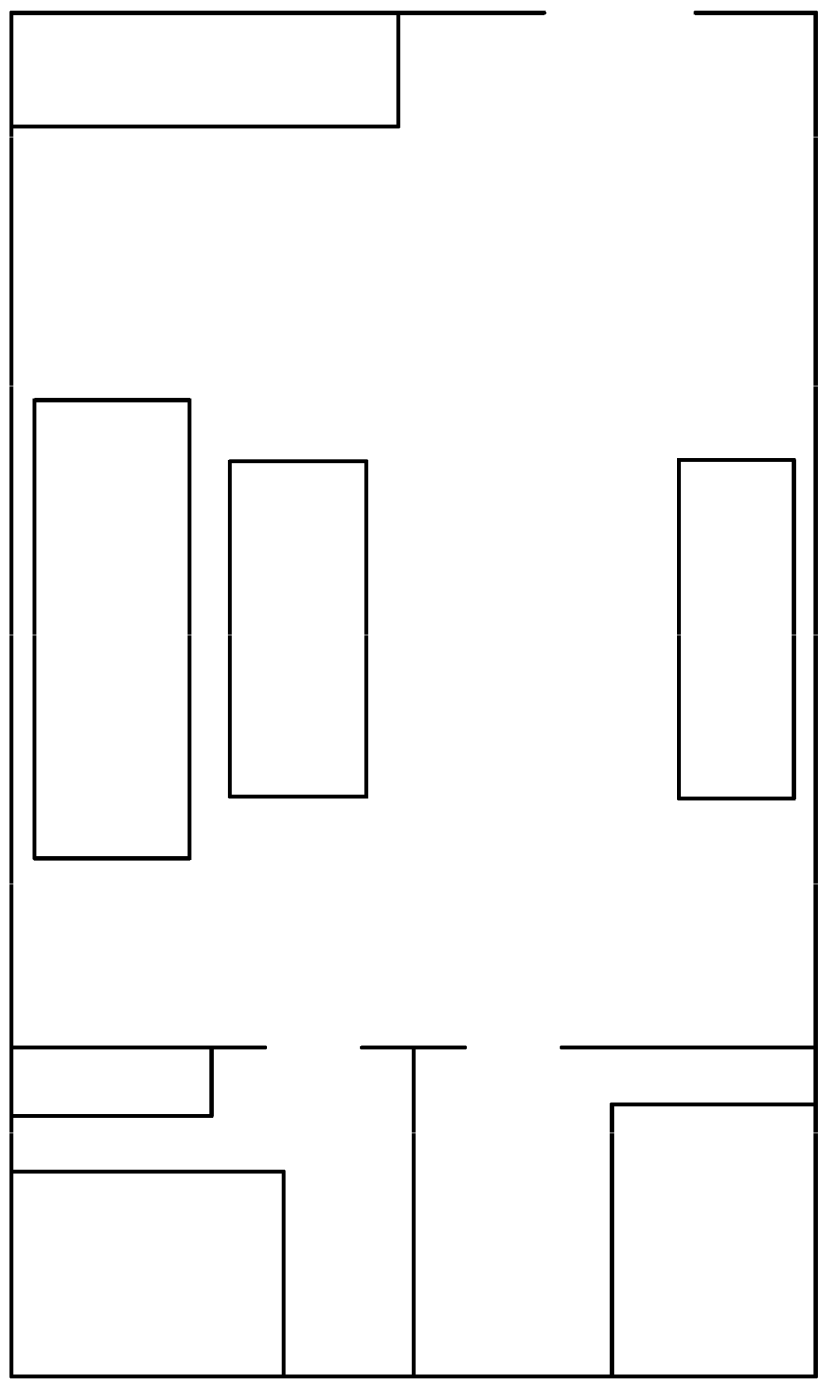
FIG. 3 is a schematic diagram of an exemplary embodiment of a specific area in accordance with some embodiments.

The control unit 220 processes the detection information $IFM_D$ to generate map information $M_1$ and position information. The disclosure does not limit the circuit structure of the control unit 220. In some embodiments, the control unit 220 includes hardware, such as microprocessors, microcontrollers, logic circuits, and memories. One of the memories stores programming code. When the programming code is executed, the microprocessors or the microcontrollers are capable of generating the map information $M_1$ and the position information. In some embodiments, the control unit 220 processes the detection information $IFM_D$ to generate the map information $M_1$ according to simultaneous localization and mapping (SLAM) technology. The outline of the specific area 130 is determined according to the map information $M_1$. FIG. 3 is a schematic diagram of an exemplary embodiment of a specific area in accordance with some embodiments.

The transmittal unit 230 transmits the map information $M_1$ to the electronic device 120. The disclosure does not limit the kind of the transmittal unit 230. In one embodiment, the transmittal unit 230 communicates with the electronic device 120 according to a wire communication protocol or a wireless communication protocol. In some embodiments, the electronic device 120 generates map information $M_2$ according to the map information $M_1$. The transmittal unit 230 receives and provides the map information $M_2$ to the control unit 220. The control unit 220 generates a driving signal $S_{D1}$ according to the position information and the map information $M_2$.

Figure 4:
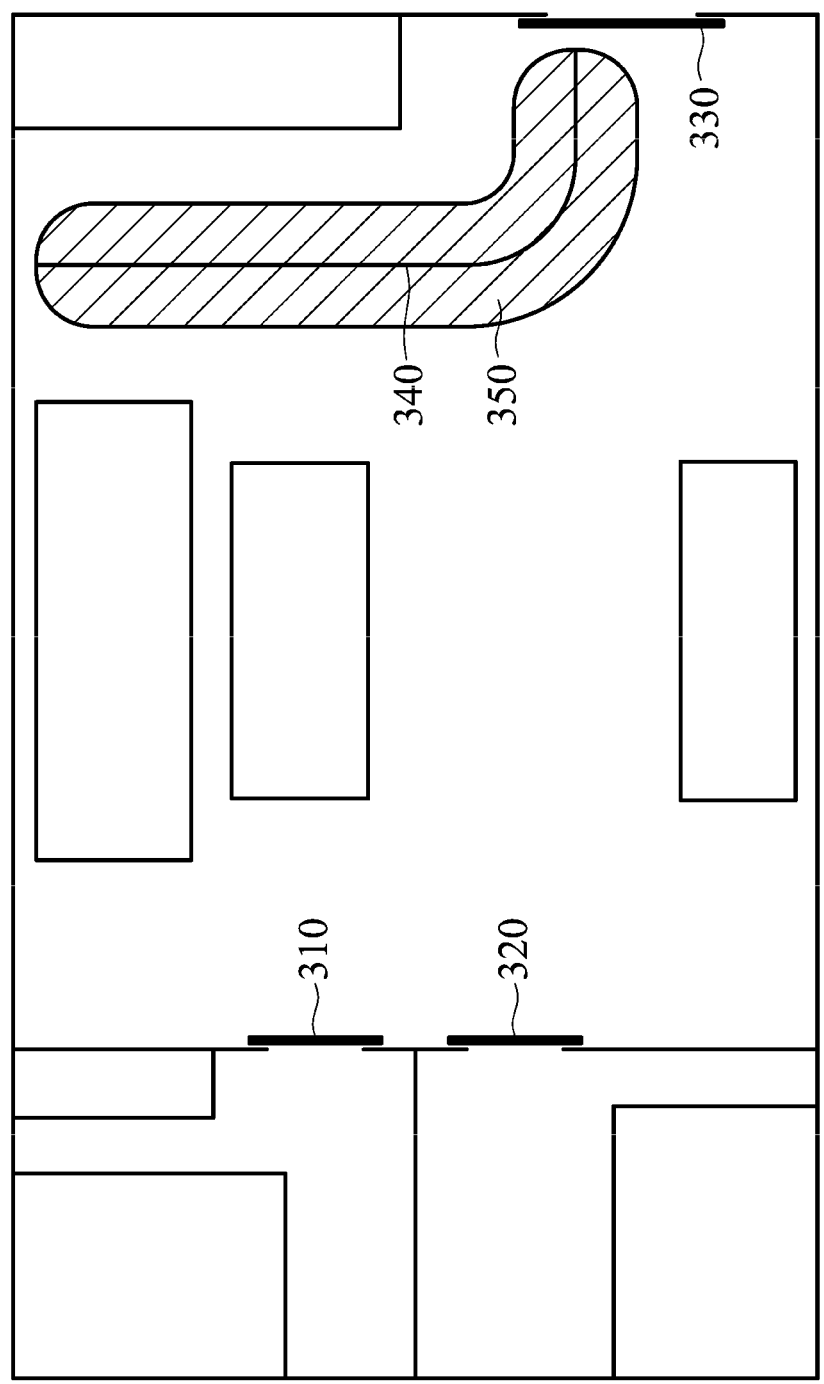
FIG. 4 is a schematic diagram of an exemplary embodiment of map information in accordance with some embodiments.

In some embodiments, the electronic device 120 modifies the map information $M_1$, serves the modified result as the map information $M_2$ and transmits the map information $M_2$ to the mobile device 110. FIG. 4 is a schematic diagram of an exemplary embodiment of the map information $M_2$ in accordance with some embodiments. A user is capable of utilizing the electronic device 120 to mark blocking lines 310-330 in the map information $M_1$ to prevent the mobile device 110 from entering the rooms 140 and 150 or leaving the living room 160.

The control unit 220 generates the driving signal $S_{D1}$ to the driving unit 240 according to the map information $M_2$ with the blocking lines 310-330. Therefore, the mobile device 110 only moves in the living room 160 and does not leave the living room 160. In some embodiments, the control unit 220 determines the location of the mobile device 110 in the specific area 130 according to the map information $M_1$ and the position information. The control unit 220 plans a traveling path of the mobile device 110 according to the map information $M_2$. Since the user does not need to utilize a virtual wall or a magnetic line to limit the traveling path of the mobile device 110, the convenience of the control system 100 is increased and the cost of the control system 100 is reduced.

In some embodiments, the user is capable of utilizing the electronic device 120 to mark an enhancement sign 340 in the map information $M_1$ such that the cleaning efficiency of the mobile device 110 is enhanced when the mobile device 110 in an unclean area 350 of the specific area 130, wherein the enhancement sign 340 corresponds to the unclean area 350 of the specific area 130. For example, if the user feels that an area around the cabinet 163 is unclean, the user can utilize the electronic device 120 to mark an enhancement sign 340 in the map information $M_1$ such that the mobile device 110 enhances the cleaning efficiency for the area around the cabinet 163. The disclosure does not limit the shape of the enhancement sign 340. In some embodiments, the enhancement sign 340 is a line segment.

The control unit 220 generates the driving signal $S_{D2}$ to a cleaning unit 250 according to the map information $M_2$ with the enhancement sign 340. Therefore, when the mobile device 110 moves into the unclean area 350 corresponding to the enhancement sign 340, the cleaning unit 250 operates in an enhancement mode according to the driving signal $S_{D2}$. In the enhancement mode, the cleaning unit 250 enhances its cleaning efficiency to clean the unclean area 350. When the mobile device 110 leaves the unclean area 350, the cleaning unit 250 operates in a normal mode according to the driving signal $S_{D2}$. In some embodiments, the cleaning efficiency of the cleaning unit 250 operating in the enhancement mode is higher than the cleaning efficiency of the cleaning unit 250 operating in the normal mode.

In some embodiments, the user is capable of utilizing the electronic device 120 to remove the enhancement sign 340. Therefore, the cleaning efficiency of the mobile device 110 is not enhanced for the unclean area 350, but the mobile device 110 still cleans the unclean area 350. In other words, the cleaning unit 250 has the same cleaning efficiency for the living room 160.

In some embodiments, the enhancement sign is removed by the control unit 220. When the control unit 220 determines that the unclean level of the unclean area 350 is less than a pre-determined level according to the detection information $IFM_D$ generated by the environment sensing unit 210, the control unit 220 removes the enhancement sign 340 such that the cleaning efficiency of the cleaning unit 250 is maintained.

In other embodiments, the enhancement sign 340 is generated by the control unit 220. For example, when the control unit 220 determines that the unclean level of the unclean area 350 exceeds the pre-determined level according to the detection information $IFM_D$ generated by the environment sensing unit 210, the control unit 220 marks an enhancement sign 340 in the map information $M_1$. When the mobile device 110 moves into the unclean area 350 corresponding to the enhancement sign 340, the control unit 220 generates the driving signal $S_{D2}$ such that the cleaning unit 250 operates in an enhancement mode.

In some embodiments, the control unit 250 activates the mobile device 110 according to the driving signal $S_{D1}$ such that the mobile device 110 operates in the unclean area 350 until the unclean level of the unclean area 350 is less than the pre-determined level. In other embodiments, the mobile device 110 moves according to a pre-determined path. Before the mobile device 110 enters the unclean area 350, the cleaning efficiency of the mobile device 110 is increased.

In some embodiments, if the user hopes that the mobile device 110 enhances the cleaning efficiency for the unclean area 350, the user is capable of utilizing the electronic device 120 to increase the depth of the enhancement sign 340. The control unit 220 determines the cleaning efficiency of the cleaning unit 250 according to the depth of the enhancement sign 340. Furthermore, the control unit 220 determines the unclean level of the unclean area 350 according to the detection information $IFM_D$ generated by the environment sensing unit 210 and adjusts the cleaning efficiency of the cleaning unit 250 according to the determined result. In some embodiments, the cleaning unit 250 is capable of providing different cleaning efficiencies.

The disclosure does not limit the structure of the cleaning unit 250. Any device can be integrated in the cleaning unit 250, as long as the device is capable of cleaning. In other embodiments, the cleaning unit 250 has a dust collecting function or a mopping function. In some embodiments, the cleaning unit 250 provides different cleaning efficiencies according to the driving signal $S_{D2}$. In other embodiments, if the mobile device 110 is not required to provide a cleaning service, the cleaning unit 250 can be omitted.

In other embodiments, the electronic device 120 is integrated in the mobile device 110. In some embodiments, the electronic device 120 is a display panel to display the map information $M_1$. The display panel provides the map information $M_2$ according to an external control command. In some embodiments, the display panel is a touch panel. A user can utilize the touch panel to modify the map information $M_1$. In other embodiments, the user utilizes buttons to modify the map information $M_1$ displayed in the display panel. The display panel transmits the modified map information $M_2$ to the control unit 220 via the transmittal unit 230.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device moving in a specific area, comprising:
   a driving unit moving according to a first driving signal;
   an environment sensing unit detecting an outline of the specific area to generate detection information;
   a control unit processing the detection information to generate first map information and position information; and
   a transmittal unit transmitting the first map information to an electronic device,
   wherein the electronic device generates second map information according to the first map information, and the control unit generates the first driving signal according to the first map information, the second map information and the position information,
   wherein the electronic device modifies the first map information to generate a modified result, serves the modified result as the second map information and transmits the second map information to the mobile device,
   wherein the electronic device is configured to receive a user input of directly marking an enhancement sign on the first map information to generate the second map information, the enhancement sign corresponding to an unclean area of the specific area, and
   wherein the mobile device is configured to receive the second map information with the marked enhancement sign and increase efficiency of the mobile device before entering the unclean area.

2. The mobile device as claimed in claim 1, wherein the environment sensing unit comprises:
   a first sensor detecting a distance between the mobile device and an object; and
   a second sensor detecting a moving length and a moving direction of the driving unit.

3. The mobile device as claimed in claim 2, wherein the first sensor is a laser sensor and the second sensor is an odometer.

4. The mobile device as claimed in claim 1, wherein the control unit processes the detection information according to simultaneous localization and mapping (SLAM) technology.

5. The mobile device as claimed in claim 1, further comprising:
   a cleaning unit controlled by the control unit to operate in a first mode or in a second mode, wherein when the mobile device moves into the unclean area, the cleaning unit operates in the first mode and has a first cleaning efficiency, and when the mobile device leaves the unclean area, the cleaning unit operates in the second mode and has a second cleaning efficiency, and the first cleaning efficiency is higher than the second cleaning efficiency.

6. The mobile device as claimed in claim 5, wherein when the unclean level is less than a pre-determined level, the control unit removes the enhancement sign from the first map information, and when the mobile device moves to the unclean area, the control unit controls the cleaning unit to operate in the second mode.

7. The mobile device as claimed in claim 1, wherein the control unit generates a second driving signal to a cleaning unit according to the second map information, whereby the cleaning unit enhances a cleaning efficiency for the unclean area.

8. The mobile device as claimed in claim 1, wherein the electronic device is separated from the mobile device.

9. The mobile device as claimed in claim 1, wherein the electronic device is integrated with the mobile device.

10. The mobile device as claimed in claim 9, wherein the electronic device is a display panel to display the first map information.

11. The mobile device as claimed in claim 10, wherein the display panel provides the second map information according to an external control command.

12. The mobile device as claimed in claim 1, wherein the control unit determines a position of the mobile device according to the first map information and plans a traveling path of the mobile device according to the second map information.

13. The mobile device as claimed in claim 1, wherein the electronic device marks at least one blocking line in the first map information to generate a marked result and serves the marked result information as the second map information.

14. The mobile device as claimed in claim 1, further comprising:
   a cleaning unit controlled by the control unit, wherein the control unit determines the cleaning efficiency of the cleaning unit according to a depth of the enhancement sign.

* * * * *